United States Patent [19]

Mudford et al.

[11] Patent Number: 4,599,236

[45] Date of Patent: Jul. 8, 1986

[54] METHOD OF PROCESSING UNSHELLED NUTS

[76] Inventors: Graeme C. Mudford; Robyn J. Mudford, both of 9 George Street, Ferntree Gully, Victoria 3156, Australia

[21] Appl. No.: 720,910

[22] Filed: Apr. 8, 1985

[30] Foreign Application Priority Data

Apr. 13, 1984 [AU] Australia ............... PG4570

[51] Int. Cl.$^4$ ................ A23L 1/36
[52] U.S. Cl. ................ 426/456; 426/482; 426/632
[58] Field of Search ........... 426/456, 465, 418, 419, 426/455, 460, 629, 632, 235, 479, 481, 482, 633, 478, 483

[56] References Cited

U.S. PATENT DOCUMENTS

| | | | |
|---|---|---|---|
| 1,448,520 | 3/1923 | Castruccio | 426/482 |
| 1,664,334 | 3/1928 | Thompson et al. | 426/482 |
| 2,318,265 | 5/1943 | Stagmeier | 426/482 |
| 2,579,245 | 12/1951 | Steiner | 426/456 |
| 2,816,839 | 12/1957 | Rockland | 426/465 |
| 2,995,166 | 8/1961 | Burley et al. | 426/241 |
| 4,358,467 | 11/1982 | Patel | 426/237 |

OTHER PUBLICATIONS

Liang, 1977 Transactions of the ASAE 20(3) 438 (abstract).
Grimwood, 1971 Report, Tropical Products Institute G66 II (abstract).
Tang et al, 1982 Transactions of the ASAE 25(6) 1733 (abstract).
Anon., 1982 Food Engineering 54(5) 150.
Kirk-Othmer, 1981 Encyclopedia of Chemical Technology, vol. 16, John Wiley & Sons, New York, pp. 264–265.

*Primary Examiner*—Raymond N. Jones
*Assistant Examiner*—Carolyn Paden
*Attorney, Agent, or Firm*—Kenway & Jenney

[57] ABSTRACT

The invention provides a process for drying macadamia and other nuts in which the nuts are first subjected to a very high humidity, as between 85% and 100%, and heated to a temperature above normal room temperature, as between 35° C. and 45° C., then subjected to a relatively low humidity, as between 10% and 15%, while maintaining the temperature, and then subjected to a very low humidity, as between 1% and 10%, at about the same or a slightly higher temperature. The process takes several days, only, instead of 10 to 13 weeks taken by the customary process.

13 Claims, 3 Drawing Figures

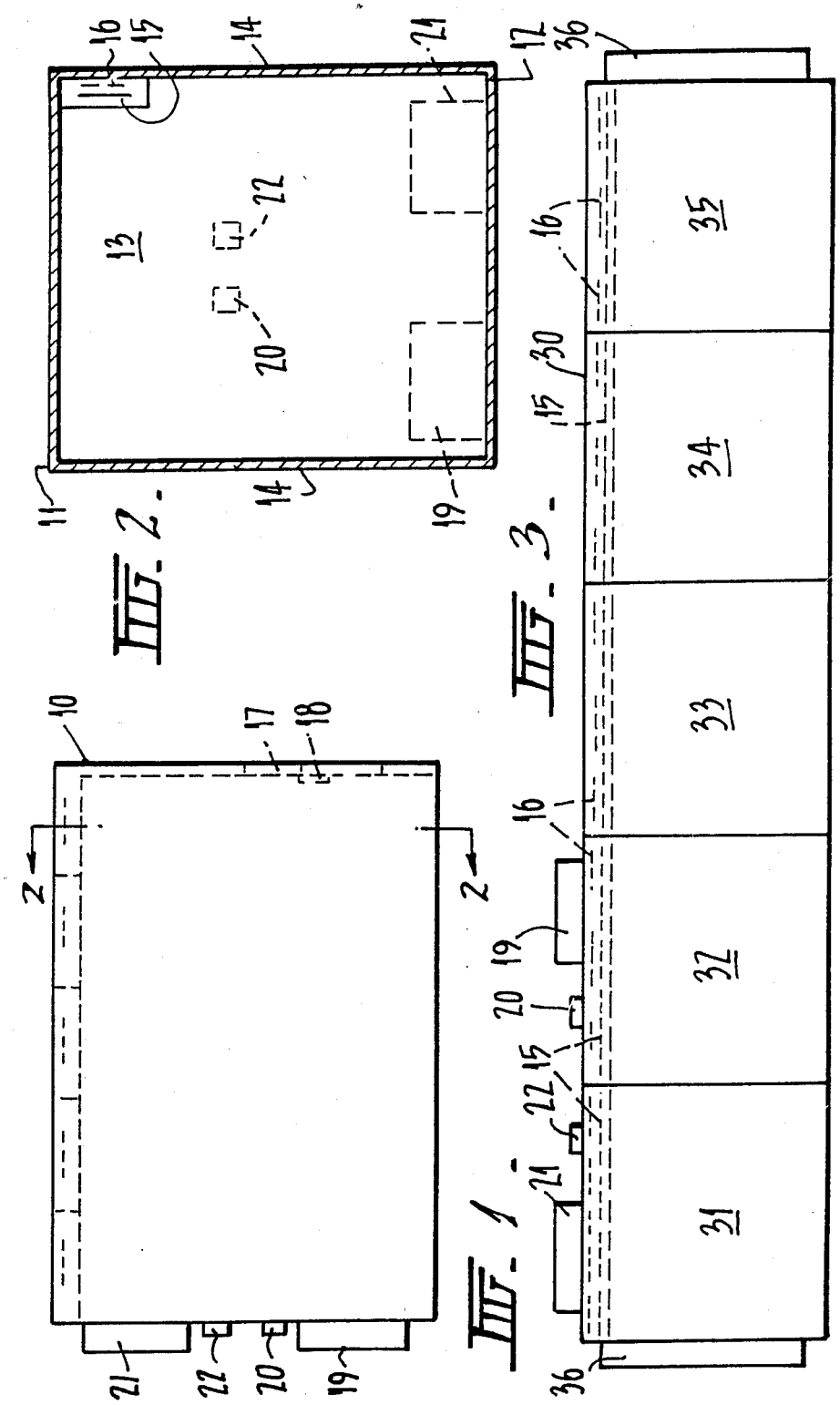

METHOD OF PROCESSING UNSHELLED NUTS

This invention relates to a process for drying nuts harvested from trees and it refers particularly to a process for drying macadamia nuts before the shells are broken to enable the edible kernels to be extracted.

It is considered by macadamia nut processors and others that the moisture content of harvested macadamia nuts should be reduced to about 1.5%–2% before cracking the nuts to remove the kernels. The nuts have very hard shells and traditionally a heating process has been used to dry the nuts and aid shell removal.

Generally, the nuts have a moisture content of between 18% and 22% when harvested and the process of drying the nuts, as at present practised, is done in two stages after the husks have been removed from the nuts, one at the farm where the nuts are harvested and the second at the nut processor's factory. In each case the drying is done in vertical open silos, the drying in the first stage being to reduce the moisture content to or below 10% and in the latter stage to reduce it to below 2%.

In the first stage appropriate electric heating elements and fan circulation are used, and heated air is blown upwardly through the nuts in the open-ended silos so as to exhaust to atmosphere. That is a somewhat wasteful process which takes from about 56 to 70 days, depending on the weather, to reduce the moisture content to 10% or less. The nuts so-treated are then transported to the processor who uses a similar silo, with either electric or gas heating, for an additional period or from 14 to 18 days, with temperatures up to 60° C., so as to dry the nuts to a desired 1.5% to 2% moisture content.

The nuts are then cracked by mechanical means and the kernels are removed.

This process results in spoilage of a significant percentage of the whole nuts—possibly due to the time the nuts are in the silos during the first stage—and in a relatively low yield of whole kernels at the end of the second stage—sometimes as low as 40% to 50% of the total nuts treated. We also believe that the present-day method of treating the nuts results in a loss of taste in the nuts—possibly due to the relatively high temperature of the second stage in the processing.

This invention has been devised with the principal object of providing an improved process of processing macadamia nuts to effect removal of moisture from the kernels. Another object is to provide a process of drying macadamia nuts which will permit a close control of the drying process at all stages and, therefore, control the quality of the kernels. A subordinate object is to provide a process for drying macadamia nuts which will lead to a lower percentage of spoilage or wastage of the nuts and a higher percentage of whole kernels obtained from the nuts treated.

In respect of the latter object it is to be noted that whole kernels bring a higher price than part or broken kernels.

A further object of the invention is to provide a process of drying macadamia nuts which will provide for improved taste in the kernels and the provision of kernels which do not require the customary cooking and salting to make them edible. This reduces the cost of preparing the kernels for sale.

Yet another object is to provide a process for the drying of macadamia nuts which will enable the oil from the nuts, macadamia oil, to be extracted and used, as a by-product of the drying process.

It is believed the process of this invention will also be applicable to the treatment of other nuts, such as monkey nuts, walnuts and so on.

According to this invention, devised with these and other objects in view, the nuts to be dried are first subjected to a high humidity for a predetermined term, then subjected to a very much reduced humidity for a predetermined term, and subsequently subjected to a still lower humidity at a relatively higher temperature to extract a required quantity of moisture from the nuts and reduce the moisture content of the nuts to a desired level.

The temperature to which the nuts are subjected during the first two steps may be between 35° C. and 45° C., preferably about 40° C., and for the later step it may be between 40° C. and 50° C., preferably about 45° C. The humidity during the first step may be as high as 100% or thereabouts, but we have found 90%–95% satisfactory. In the second step the humidity is reduced below 30%, preferably down to between 10% and 15%, and in subsequent stages it may be further reduced to, say 5% to 10%, such as 8%, and then down to between 1% and 10%, preferably 6%. The times taken for the several steps may vary according to conditions but we have found a total time of 5 days will generally enable us to dry the nuts down to a desired 1.5% moisture content, with the first step taking 24 hours, the second step a total of 48 hours and the third step also taking 48 hours divided into two stages each of 24 hours, one with a humidity of, say, 8% and the second with a lower humidity.

We have found that the nuts treated by this process have cracks in the shells of the nuts, and believe such cracking is a significant factor in the relative speed of the process as it would appear that moisture within the shells would be extracted more rapidly because of the cracks in the shells.

We have also found that the large majority of the kernels in the nuts are separated from the inner walls of the shells—that is to say, loose in the nuts—at the conclusion of the drying process. This appears to provide for a very high percentage of whole kernels, as between 80% and 95%, when the nuts have been opened to remove the kernels.

Further, the fact that the nuts are cracked during the drying process—generally, each nut has a crack extending between one-quarter and half-way around the nut—makes the nuts easier to break open for extracting the kernels. In consequence there is a reduced likelihood of damage to the kernels when the nuts are treated to extract the kernels.

The nuts to be treated are placed in an insulated chamber, heated and the humidity increased—which may result from the natural increase in humidity within the chamber resulting from the applied heat, or may be assisted by the introduction of steam from a boiler—then the humidity is decreased as by use of an air conditioning unit operatively connected to the interior of the chamber. As the air conditioning unit may be controlled it is apparent that the humidity within the chamber may be controlled accurately, so that the subsequent drying process may be carried out accurately. Means are provided to ensure a circulation of the air within the chamber, as by fans, and the heating means may be electric elements placed behind the fans. Also, means are provided for both reading and recording the temperature and the humidity within the chamber, and there may be means for extracting samples of the nuts for testing at different stages during the drying of the nuts.

In the operation of the air-conditioning unit the moisture in the chamber is extracted in the unit and is allowed to flow into collecting trays or other containers. At the same time a quantity of the oil in the nuts is also extracted and collected, and subsequently separated from the water for use as a by-product. That is not possible in the existing process as described initially above, as the heated air is exhausted to atmosphere and takes with it the collected moisture and the oil.

In order that the invention may be clearly understood and conveniently put into practical effect we shall now describe the process of the invention with reference to the accompanying illustrative drawings, which show one arrangement of apparatus for carrying out the process of this invention and a modification. In these drawings:

FIG. 1 is a plan view of a treatment chamber and air-conditioning equipment;

FIG. 2 is a cross-sectional view on the line and in the direction of the arrows 2—2 of FIG. 1; and FIG. 3 is a plan view of a modified apparatus for carrying out the process in a continuous manner.

The treatment chamber 10 depicted in FIGS. 1 and 2 is for carrying out the process in batches and it has a heat insulated top 11, base 12, ends 13 and side walls 14. Mounted at the upper end of one side wall, on the inside, is a battery of fans 15, each having its own control switch, to provide for rapid circulation of air within the chamber, and mounted behind each fan 15 is a heating element 16. At the front of the chamber 10 is a door 17 having an inspection window (not shown) for viewing the contents of the chamber and reading the appropriate instruments 18 for showing temperature and humidity within the chamber. An air-conditioner unit 19, for drying the air within the chamber 10, is mounted at one end of the chamber and controls 20 for the air-conditioner are mounted adjacent the air-conditioner unit on the rear wall. Also mounted at the rear end of the chamber is a boiler 21 for providing controlled quantities of steam to the interior of the chamber 10, as well as a control unit 22 for the boiler and steam supply.

In one example of the process of the invention 2245 kilograms of dehusked macadamia nuts having an initial moisture content of 18.1% were placed in 50 woven sacks and 1 small air-tight sack and loaded into the chamber 10—the small air-tight sack being for experimental purposes to ascertain if the drying of the nuts could be carried out in such containers.

At 11 a.m. on the first day the door 17 was closed, the ambient temperature being 10° C. and the temperature of the nuts being 11° C. Relative humidity of the air in the chamber 10 was 50° C. Fans 15 were switched on to maintain circulation, and the heating elements 16 were also switched on.

Stage 1: Within 9 hours the temperature within the chamber was increased to 40° C. and the relative humidity increased to between 90% and 95%. That temperature and humidity were maintained for the remainder of 24 hours, several of the heating elements 16 being switched off.

Stage 2: At the end of the first day of treatment the air-conditioning unit 19 was switched on to effect drying of the atmosphere within the chamber 10. Within 5 hours the relative humidity was reduced to 15% and subsequently to 12%, whilst maintaining the temperature at 40° C. That humidity (12%) and temperature (40° C.) were maintained for the remainder of 48 hours.

Stage 3: At the conclusion of 72 hours from the commencement of the process the relative humidity was reduced still further, to 8% and the temperature was increased to 45° C., and held at those figures for the remainder of 24 hours.

Stage 4: During the fifth and last day of the process the relative humidity was reduced to 6% whilst maintaining the temperature at 45° C.

At the conclusion of the process nuts from a sample batch of those packed in the woven bags were tested. It was found that those nuts had cracks through the shells, which facilitated the cracking of the nuts to remove the kernels, that approximately 90% of whole kernels were recovered and the moisture content was 1.5%.

We retained the moisture extracted from the atmosphere within the chamber, and found that a quantity of oil had been extracted from the nuts. That was separated from the water, for use as a by-product of the process. We belive the oil is useful in the manufacture of cosmetics, and for other purposes.

We deem it advisable to mention that the temperature within the chamber can be readily controlled by selection of the number of heating elements 16 to be in operation at any one time. Also, although we provided the boiler 21 for providing an initial high humidity it was not necessary to use that boiler in the test run described above as the nuts provided the increased humidity as soon as the temperature was increased. However, in some cases the nuts may have a low surface moisture content and the additional means will be required to provide the desired high humidity.

Also, the capacity of the chamber 10 was greatly beyond the 2245 kilograms of whole nuts tested and we believe it will take longer than, say, 4 to 5 hours to reduce the humidity at Stage 2 to 15% and then down to 12%. Obviously, the greater the quantity of nuts to be treated the more moisture there will be to be extracted and the longer it will take to reduce the humidity from the initial high level of Stage 1. It should also be mentioned that at the start of the moisture extraction step, after reduction of humidity during Stage 2, the rate of moisture extraction is greater than at a later period. We believe that once the nuts have been partly dried the rate of extraction of moisture slows for a given period of time.

We should also mention that the small quantity of nuts in a sealed bag were not dried effectively, showing that, or so we believe, a flow of air over the nuts is required to effect the drying process.

The batch process described above may be modified by providing means for carrying out a continuous process, such means being illustrated diagramatically in FIG. 3. As shown in that figure of the drawings a substantially longer chamber 30 may be provided, that chamber having a number of compartments 31, 32, 33, 34 and 35. A conveyor belt 36 with appropriate driving means and controls is mounted so as to travel the full length of the chamber 30 and to project from the opposite ends thereof to receive and discharge bins containing nuts to be treated. The bins (not shown) will need to be provided with a large number of openings of a size smaller than the nuts to permit free flow of air through the bins and the nuts contained in them. The conveyor is driven at a speed such that a bin entering the chamber 31 will take five days before it is carried out the end of the compartment 35. If desired, the conveyor may be driven intermittently in such manner that a bin placed on the input end will be carried into the compartment 31 at a suitable speed and held stationary therein for one day, then moved into the compartment 32 and held in that compartment for a day, and so on until at the end of the fifth day the conveyor 36 is operated to discharge the bin and its contents from the output end of the chamber 30.

In this continuous process the compartments are maintained at the required temperatures and humidity, as follows:

Compartment 31°–40° C. and 90%–95% humidity;
Compartment 32°–40° C. and humidity reduced to 15%–12%;
Compartment 33°–40° C. and 12% humidity;
Compartment 34°–45° C. and humidity reduced to 8%;
Compartment 35°–45° C. and humidity reduced to 6%.

Naturally, when the binned nuts are conveyed from compartment 31 into compartment 32 the humidity is initially quite high and it takes some time to reduce it to 15% and to 12%. Similarly, in the movements into compartments 34 and 35 the humidity does not drop instantly as the moisture must be extracted from the nuts.

Appropriate heating and air-circulating means are provided in each of the compartments, and the air-conditioning unit 19 is connected to each of the compartments 32, 33, 34 and 35, or a separate unit and appropriate controls may be provided for each said compartment.

It is to be understood that other modifications may be made in details of design, construction and arrangement of the apparatus for use in carrying out the process, and that the process itself may be modified to suit the nature of the products to be treated. Thus, for example, the times taken for the treatment of the nuts in each of the five steps or stages may be shortened or extended, as between 18 and 30 hours, so that the total time of treatment may be between 4 days and 6 days. That will depend, to an extent, on the initial moisture content of the nuts. Provision may also be made for extracting samples of the nuts being treated, for testing, in known manner. Also, it may be found convenient to reduce the humidity from the very high humidity in the first stage directly to, say 12% in the second stage and to hold the atmosphere at that humidity for the remainder of, say, two days instead of reducing humidity in two steps. Similarly, the humidity may be reduced directly to the lowest desired humidity, instead of taking two steps to do so.

All such modifications are to be deemed to be included in the ambit of the invention as defined by the appended claims.

We claim:

1. A process for drying unshelled nuts, said process including the first step of subjecting the nuts to a very high humidity at a temperature above normal room temperature, the second step of then subjecting the nuts to a relatively low humidity whilst maintaining the temperature above normal room temperature for a period of time sufficient to facilitate cracking of the shells of said nuts, and the third step of increasing said temperature and further reducing said humidity to facilitate removal of moisture until the nuts have been dried to a desired exent, said temperature above normal room temperature not exceeding 50° C.

2. A process for drying nuts as claimed in claim 1 wherein the very high humidity to which the nuts are first subjected is between 85% and 100%.

3. A process for drying nuts as claimed in claim 2 wherein the very high humidity to which the nuts are first subjected is between 90% and 95%.

4. A process for drying nuts as claimed in claim 1 wherein the temperature above normal room temperature to which the nuts are first subjected is between 35° C. and 45° C.

5. A process for drying nuts as claimed in claim 4 wherein the temperature is 40° C.

6. A process for drying nuts as claimed in claim 1 wherein the step of subjecting the nuts to a relatively low humidity is carried out in two stages, the first of those two stages being subjecting the nuts to a humidity between 10% and 15% and the second stage being subjecting the nuts to a humidity between 1% and 10%.

7. A process for drying nuts as claimed in claim 6 wherein the humidity in the first of said stages is 12%.

8. A process for drying nuts as claimed in claim 6 wherein the humidity in the second of said stages is from 8% to 6%.

9. A process for drying nuts as claimed in claim 6 wherein the temperature during the first stage of the second step is between 35° C. and 45° C.

10. A process for drying nuts as claimed in claim 6 wherein the temperature during the first stage of the second step is 40° C.

11. A process for drying nuts as claimed in claim 6 wherein the temperature during the second stage of the second step is between 40° C. and 50° C.

12. A process for drying nuts as claimed in claim 6 wherein the temperature during the second stage of the second step is 45° C.

13. A process of drying macadamia nuts including the first step of subjecting the nuts to a humidity of between 90% and 95% at a temperature of between 35° C. and 45° C. for a period between 18 and 30 hours, the second step of subjecting the nuts to a humidity of between 10% and 15% at a temperature of between 35° C. and 45° C. for a period of between 36 and 60 hours, the third step of subjecting the nuts to a humidity of between 5% and 10% at a temperature of between 40° C. and 50° C. for a period of between 18 and 30 hours, and the fourth step of subjecting the nuts to a humidity of between 1% and 8% at a temperature of between 40° C. and 50° C. for a period of between 18 and 30 hours, the total time being between 96 hours and 144 hours.

* * * * *